US011486183B2

(12) United States Patent
Sostarecz

(10) Patent No.: US 11,486,183 B2
(45) Date of Patent: Nov. 1, 2022

(54) MOVABLE BARRIER OPERATOR AND GEARBOX THEREOF

(71) Applicant: The Chamberlain Group LLC, Oak Brook, IL (US)

(72) Inventor: Zoltan Sostarecz, Melrose Park, IL (US)

(73) Assignee: The Chamberlain Group LLC, Oak Brook, IL (US)

( * ) Notice: Subject to any disclaimer, the term of this patent is extended or adjusted under 35 U.S.C. 154(b) by 376 days.

(21) Appl. No.: 16/665,920

(22) Filed: Oct. 28, 2019

(65) Prior Publication Data

US 2021/0123286 A1   Apr. 29, 2021

(51) Int. Cl.
*E05F 15/67* (2015.01)
*F16H 1/16* (2006.01)

(52) U.S. Cl.
CPC .............. *E05F 15/67* (2015.01); *F16H 1/16* (2013.01); *E05Y 2900/106* (2013.01)

(58) Field of Classification Search
CPC .................................. F16H 1/16; E05F 15/67
See application file for complete search history.

(56) References Cited

U.S. PATENT DOCUMENTS

| | | | | |
|---|---|---|---|---|
| 2,038,731 A * | 4/1936 | Gunderson | ............... | F16H 1/16 74/606 R |
| 2,755,081 A * | 7/1956 | Johnson | ................. | E05F 15/67 188/77 R |
| 4,185,514 A * | 1/1980 | Edwards | ................... | F16H 1/16 74/421 A |
| 4,280,377 A * | 7/1981 | Richards | .............. | B23Q 16/025 74/813 R |
| 4,813,303 A * | 3/1989 | Beezer | ................... | H02K 7/081 74/DIG. 10 |
| 5,216,929 A * | 6/1993 | Ochiai | ................... | H02K 7/081 74/425 |
| 5,747,903 A * | 5/1998 | Klingler | ................. | H02K 7/081 310/90 |

(Continued)

FOREIGN PATENT DOCUMENTS

| | | |
|---|---|---|
| CN | 107487172 | 12/2017 |
| DE | 2526208 | 1/1976 |

(Continued)

OTHER PUBLICATIONS

InfinityQS, The Importance of Standardization: Part I—The Benefits of Standardization in Manufacturing, retrieved from https://www.infinityqs.com/benefits-of-standardization-in-manufacturing, Dec. 12, 2018, 7 pages.

(Continued)

*Primary Examiner* — Jake Cook
(74) *Attorney, Agent, or Firm* — Fitch, Even, Tabin & Flannery LLP

(57) ABSTRACT

A movable barrier operator that includes a motor, an armature shaft of the motor, and a worm screw assembled with a distal end portion of the armature shaft. The movable barrier operator further includes a worm wheel engaged with the worm screw and a rotatable drive member connected to the worm wheel. Turning of the armature shaft and worm screw mounted thereto causes turning of the worm wheel and rotatable drive member.

5 Claims, 9 Drawing Sheets

(56) References Cited

U.S. PATENT DOCUMENTS

| | | | |
|---|---|---|---|
| 6,215,209 B1* | 4/2001 | Yamamoto | H02K 15/14 |
| | | | 310/90 |
| 6,564,666 B1* | 5/2003 | Marcel | F16H 1/16 |
| | | | 74/425 |
| 7,107,722 B2 | 9/2006 | Casali | |
| 9,115,792 B2 | 8/2015 | Skotty | |
| 2013/0213166 A1* | 8/2013 | Cheung | F16H 57/0025 |
| | | | 74/425 |

FOREIGN PATENT DOCUMENTS

| | | |
|---|---|---|
| DE | 2827922 | 1/1980 |
| DE | 3114978 | 2/1982 |
| EP | 1175848 | 1/2002 |
| KR | 20050123464 | 12/2005 |
| KR | 764208 B1 | 8/2007 |
| WO | 2014116176 | 7/2014 |

OTHER PUBLICATIONS

Non-Patent Literature Document; Images of garage door opener motor and gearbox publicly available as of Jan. 2014; 2 pages.

\* cited by examiner

MOVABLE BARRIER OPERATOR AND GEARBOX THEREOF

FIELD

The present disclosure relates to movable barrier operators and, more specifically, to movable barrier operators with gearboxes.

BACKGROUND

Movable barrier operators, such as garage door openers, may be configured to operate over a range of door movement (e.g. opening and/or closing) speeds. For example, in the residential garage door opener market, door opening speeds are often in the range of six inches per second to ten inches per second. To provide a desired door speed for a particular garage door opener, the garage door opener manufacturer may provide the garage door opener with a transmission comprising a gearbox with gears that convert higher speed turning of an armature shaft of a motor of the movable barrier operator to lower speed turning of a drive gear or sprocket. The gears selected for a particular application may provide a gear ratio that achieves a desired garage door speed and/or lifting force.

The gears of a garage door opener gearbox may include a worm screw that has a unitary, one-piece construction with the armature shaft of a motor. During manufacture of the gearbox, the garage door opener manufacturer provides a motor having a particular worm screw on the armature shaft and provides a worm wheel having a diameter that will engage the worm screw. The worm screw is advanced through the inner diameter of a bearing of the gearbox that rotatably supports the armature shaft before the motor is secured to the gearbox. Next, the worm wheel is mounted to an output shaft of the gearbox and the worm wheel is positioned in the gearbox in engagement with the worm screw previously advanced through the inner diameter of the gearbox bearing. The output shaft protrudes from the gearbox and a drive gear or drive sprocket is mounted to the output shaft of the gearbox for driving a chain or belt. The worm screw and worm wheel provide a gear ratio to convert higher speed rotation of the motor armature shaft into lower speed, but higher torque, rotation of the gearbox output shaft.

A challenge arises when the garage door opener manufacturer wants to provide garage door openers that produce different door speeds. The manufacturer may be unable to simply provide a gearbox with a larger or smaller worm wheel because the axis of rotation of the worm wheel and the worm screw, as well as the geometry of the worm screw, are fixed by the motor and the gearbox housing. One solution is to design and manufacture a unique gearbox and motor combination for each desired door speed. Because the garage door opener manufacturer may desire to offer a range of door speeds, this approach creates a significant increase in parts provided by a garage door opener manufacturer which complicates design, manufacture, and servicing of the garage door openers.

DETAILED DESCRIPTION

Figure 1:
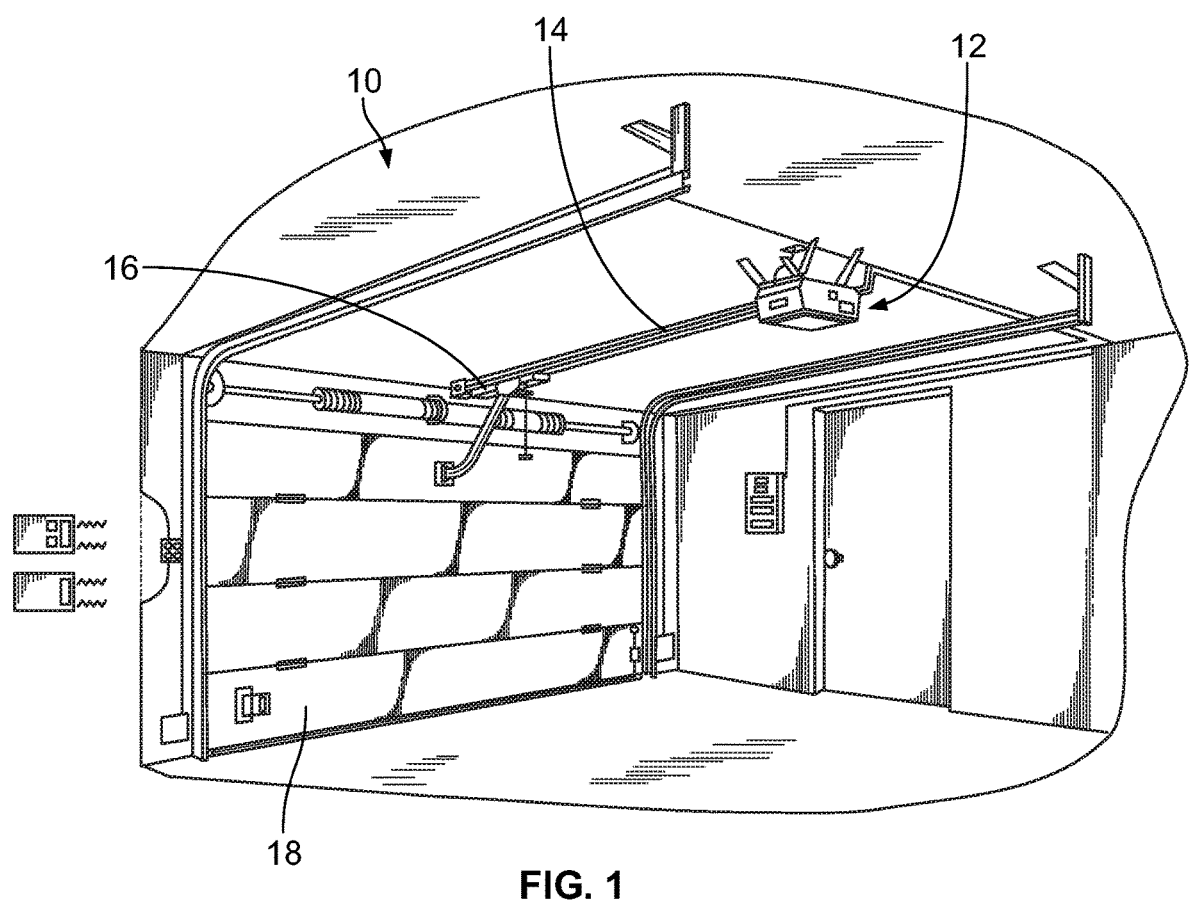
FIG. 1 is a perspective view of an example movable barrier operator in the environment of a garage.

Regarding FIG. 1, a movable barrier operator system 10 is provided that includes a movable barrier operator 12, such as a garage door opener, that moves an elongate drive member 14, such as a chain or belt, connected to a trolley 16. The trolley 16 is connected to a movable barrier, such as a garage door 18, so that movement of the elongate drive member 14 caused by the movable barrier operator 12 generates movement of the trolley 16 and associated movement of the garage door 18 between open and closed positions thereof.

Figure 2:
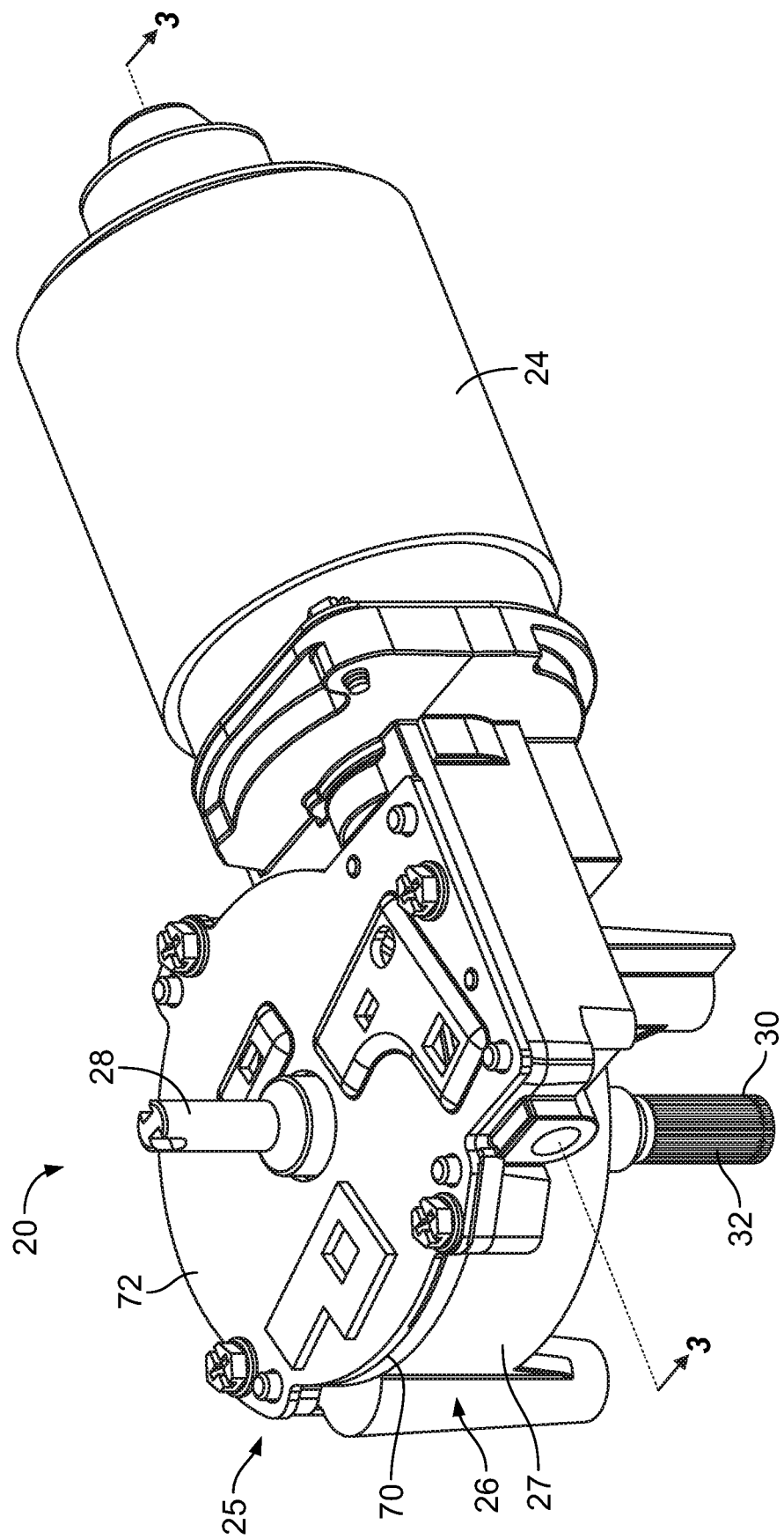
FIG. 2 is a perspective view of an example motor and an example gearbox of the movable barrier operator of FIG. 1.

Regarding FIG. 2, the movable barrier operator 12 includes an example powertrain 20 having a motor 24, which may be electrically-powered, and a gearbox 26. The gearbox 26 has a housing 25 that includes a body 27 and a cover 72. The gearbox 26 includes an output shaft 28 and a drive shaft 30 protruding from the housing 25 that turn together with operation of the motor 24. The output shaft 28 may be connected to a timer gear, such as a component of an encoder (e.g. optical detection system), that may be used by the movable barrier operator 12 to determine the position of the garage door 18 based on the rotation of the output shaft 28. The drive shaft 30 may include splines 32 and is configured to be connected to a rotatable drive member, such as a pulley or sprocket, which engages the elongate drive member 14. Turning of the drive shaft 30 causes turning of the rotatable drive member and movement of the elongate drive member 14 and garage door 18 connected thereto.

Figure 3:
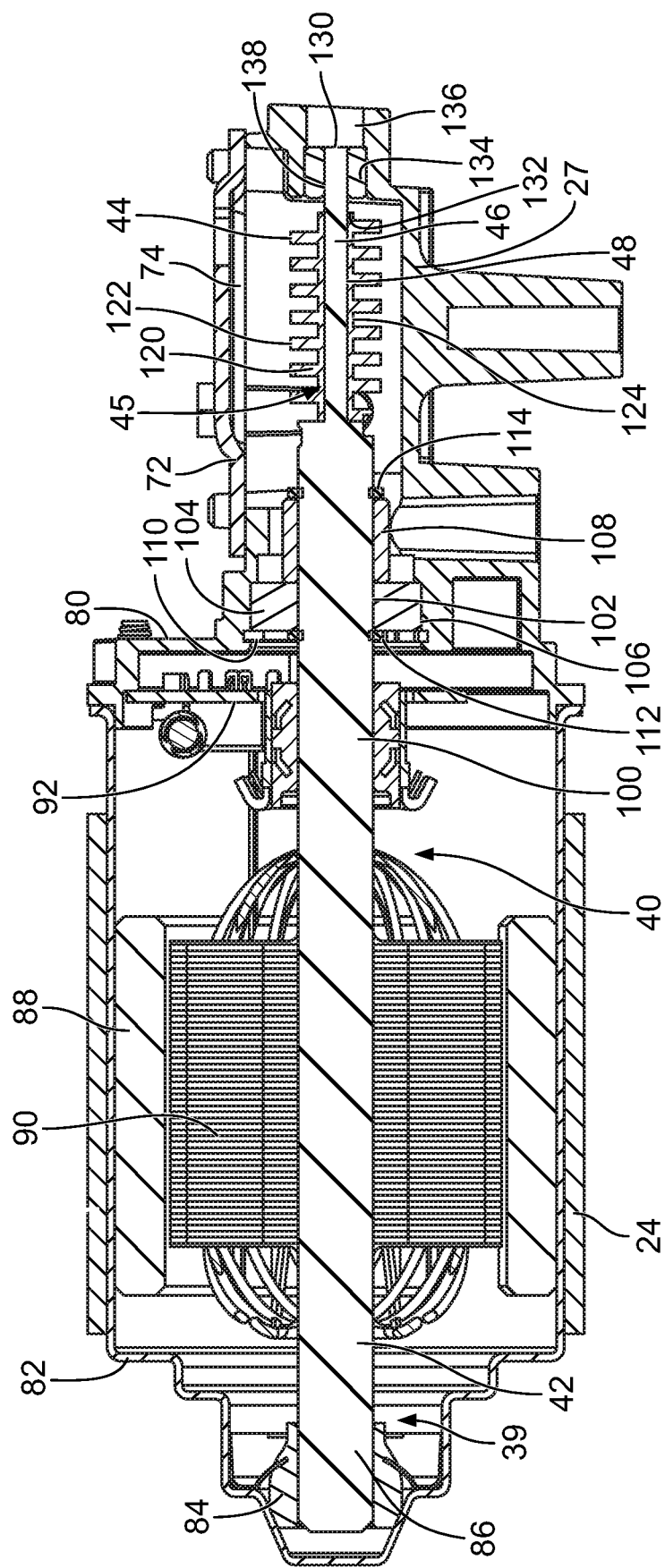
FIG. 3 is an example cross-sectional view taken across line 3-3 in FIG. 2 showing an armature shaft assembly of the motor that extends into the gearbox.
Figure 4:
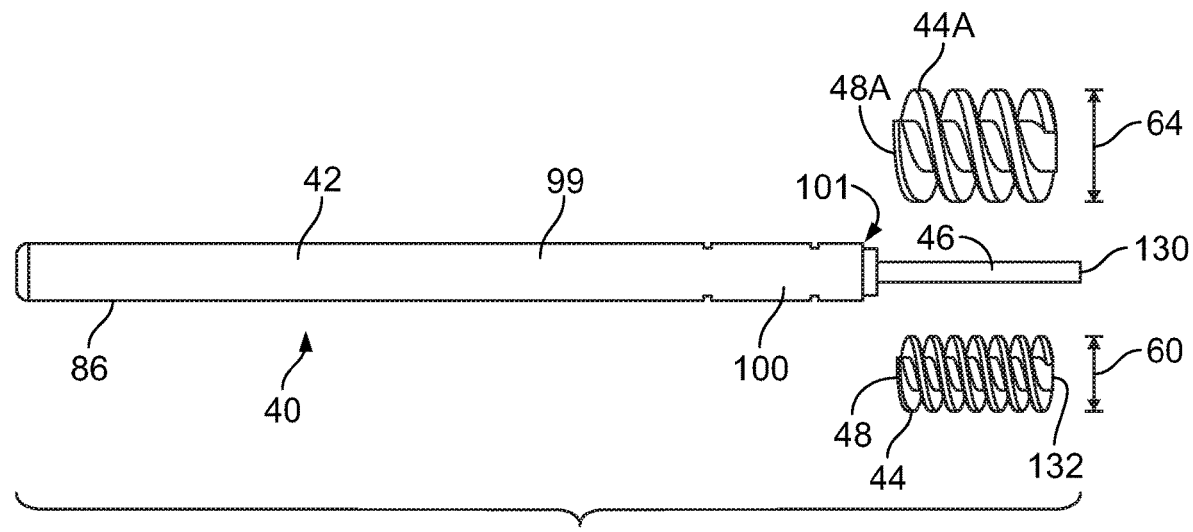
FIG. 4 is an example side view of the armature shaft assembly of FIG. 3 showing an armature shaft and a first worm screw of the armature shaft assembly, as well as a second worm screw that may be utilized instead of the first worm screw to provide a different gear ratio for the gearbox.

Regarding FIGS. 3 and 4, the motor 24 comprises an armature 39 including an armature shaft assembly 40 with an armature shaft 42 and a worm screw 44. The armature shaft 42 includes a body 99 having a stepped configuration defined by a shoulder 101. The body 99 has an intermediate portion 100, a smaller diameter distal end portion 46 extending from a distal end of the intermediate portion 100, and a proximal end portion 86. The proximal end portion 86 and intermediate portion 100 have a diameter greater than the diameter of the distal end portion 46. The distal end portion 46 may have a length that corresponds to, such as being somewhat longer than, a length of the worm screw 44 to facilitate assembly of the worm screw 44 on the armature shaft 42. The armature shaft assembly 40 includes a connection 45 between the armature shaft 42 and the worm screw 44 that permits the worm screw 44 to be assembled with the armature shaft 42 inside the gearbox housing 25. The connection 45 permits the worm screw 44 to be connected to the armature shaft 42 within the gear box 26 rather than having to advance the worm screw 44 through an opening 102 (see FIG. 3) of a bearing 104 through which the armature shaft 42 extends. The non-unitary, distinct worm screw 44 and armature shaft 42 thereby permit a range of differently sized worm screws 44 to be utilized with the same armature shaft 42 without being limited by the size of the bearing opening 102. The worm screw 44 and worm wheel 50 may thereby be selected from respective pluralities of worm screws 44 and worm wheels 50 having different geometries, characteristics or parameters to provide a desired gear ratio and produce a desired door speed, torque or lifting force for a particular application. For example, worm screw 44 in FIG. 4 has an outer diameter 60, a fine helical thread and a through bore 48, whereas another worm screw 44A has a larger outer diameter 64, a coarse helical thread and a through bore 48A similarly sized to through bore 48 of worm screw 44. The movable barrier operator manufacturer may select either of worm screw 44 or worm screw 44A and then connect the selected worm screw 44, 44A via respective through bore 48, 48A to the armature shaft 42 to provide the desired gear ratio with a selected worm wheel.

Figure 5:
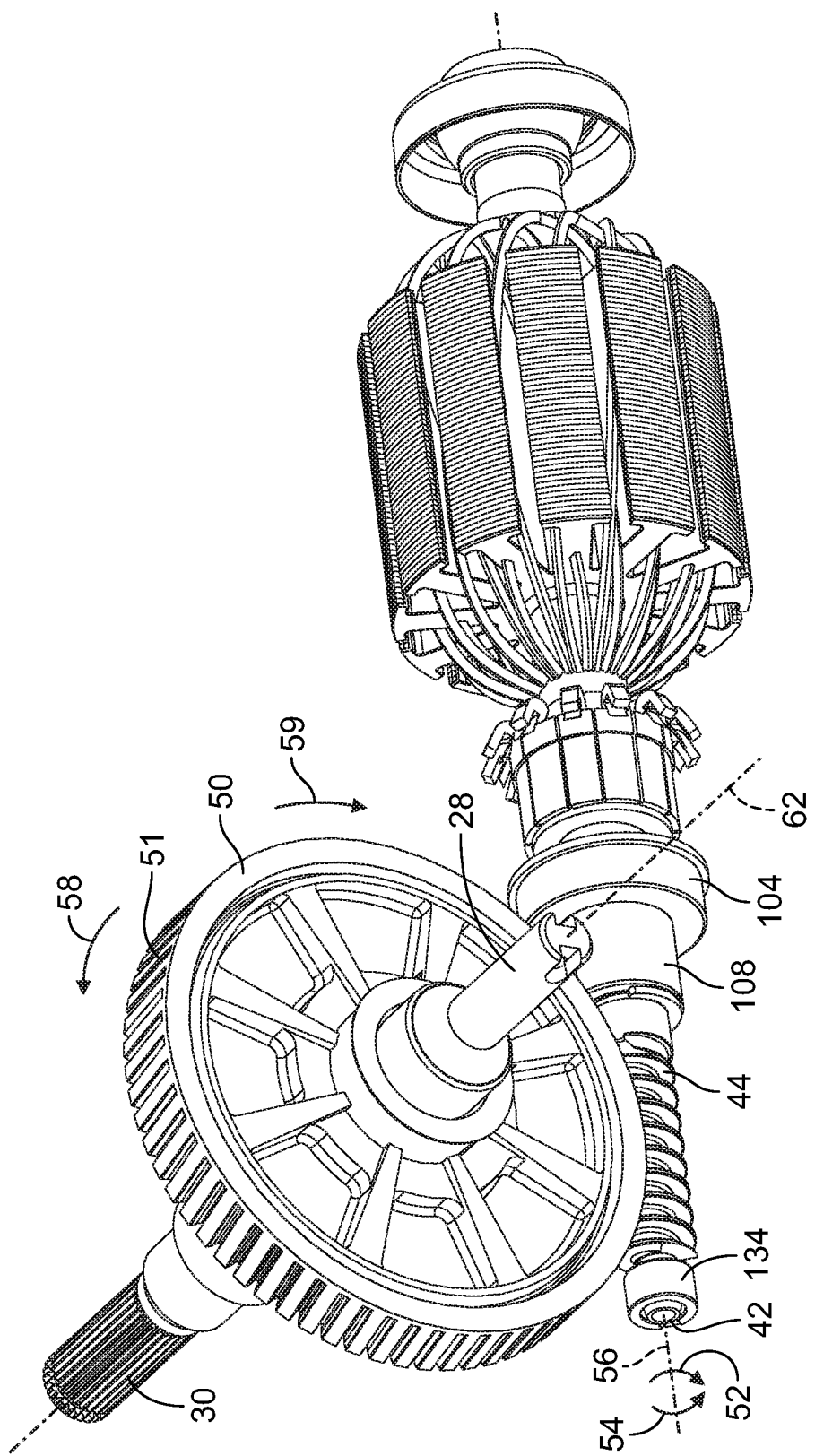
FIG. 5 is a perspective view of an example worm wheel and an example worm screw of the gearbox of FIG. 2 showing the worm screw engaged with the worm wheel and positioned on the armature shaft between a nose bearing, a bushing, and a bearing of the gearbox.

In one embodiment, the connection 45 includes a distal end portion 46 of the armature shaft 42 that extends in a through bore 48 of the worm screw 44. The worm screw 44 is fixed to the armature shaft 42, such as by a press fit, interference fit, glue, weld, fastener, and/or threads such that the worm screw 44 and the armature shaft 42 revolve together. The powertrain 20 further includes the worm wheel 50 engaged with the worm screw 44 and connected to the output and drive shafts 28, 30. Regarding FIG. 5, turning of the worm screw 44 in directions 52, 54 about an axis 56 generates turning of the worm wheel 50 respectively in directions 58, 59 about an axis 62.

The worm screw 44 and worm wheel 50 pairing may permit a gear ratio or speed reduction in the range of 30:1 to 80:1 depending on the geometry selected for the worm screw 44 and worm wheel 50. Examples of the aspects of the geometry of the worm screw 44 that may be selected to provide the desired speed reduction include the outer diameter of the worm screw 44, thread outer diameter, number of threads, thread shape, pressure angle, module, and pitch. Examples of the aspects of the geometry of the worm wheel 50 that may be selected to provide the desired speed reduction include the outer diameter, number of teeth, shape of teeth, pitch, pressure angle, and module or diametral pitch. Because the geometries of the worm screw 44 and worm wheel 50 may be selected without the geometry of the worm screw 44 being limited by the inner diameter of the opening 102 of the bearing 104, the geometry of the worm screw 44 and worm wheel 50 may be selected to optimize the mesh between the worm screw 44 and worm wheel 50 and reduce noise. Further, the geometries of the worm screw 44 and worm wheel 50 may be selected to maximize power transmission without being limited by the inner diameter of the opening 102 of the bearing 104.

The ability of a movable barrier operator manufacturer to provide a gearbox 26 having a desired speed reduction without the geometry of the worm screw 44 being limited by the inner diameter of the bearing opening 102, as well as the gearbox 26 having a fixed relationship between the two axes 56, 62, reduces the number of parts the manufacturer needs to provide for a range of movable barrier operator door speeds. Specifically, one gearbox housing 25 may be utilized for different worm screws 44, 44A having different outer diameters, numbers of teeth, and/or configurations of teeth as well as different worm wheels 50 having varying outer diameters, number of teeth 51, and/or configurations of teeth 51. The gearbox housing 25 and motor 24 provide fixed axes 56, 62 that remain the same regardless of the size and/or configuration of the worm screw 44 and the worm wheel 50 utilized in the gearbox 26. The worm screw 44 and worm wheel 50 are the components that are configured to provide a particular gear ratio for the gear box 26. Thus, a single version of the gearbox body 27, motor 24, armature shaft 42, shafts 28, 30, and other internal components of the gearbox 26 may be utilized for a range of door speeds. In this manner, the gearbox 20 reduces the number of parts the manufacturer must design, manufacture, and maintain in stock.

Regarding FIGS. 2 and 3, the gearbox body 27 has a primary opening, such as the opening 106, through which the armature shaft 42 extends. The gearbox body 27 includes one or more secondary openings, such as opening 70, and a cover 72 that closes the opening 70. The secondary opening may also include an opening 136 that receives a nose bearing 134. The gearbox body 27 includes a compartment 74 that receives the worm screw 44 and the worm wheel 50. The openings 106, 70, and 136 are in communication with the compartment 74.

Regarding FIG. 3, the motor 24 is secured to a side wall 80 of the gearbox body 27. The motor 24 includes a housing 82 that contains a proximal bearing 84 for rotatably supporting the proximal end portion 86 of the armature shaft 42. The motor 24 includes one or more magnets 88 that magnetically interacts with energized windings 90 of the armature 39 of the motor 24. The motor 24 includes a brush plate 92 having circuitry that provides electrical power to the windings 90 of the armature 39 for causing rotation of the armature shaft 42. The armature shaft 42 includes an intermediate portion 100 extending through a central opening 102 of the bearing 104 mounted the opening 106 of the gearbox body 27. The intermediate portion 100 may also extend through a spacer 108. The powertrain 20 may include a snap ring 110 that engages an annular groove of the side wall 80 of the gearbox body 27 to retain the bearing 104 in the opening 106. The armature 39 includes a snap ring 112 and a snap ring 114 that seat in grooves 159, 160 (see FIG. 6) of the armature shaft 42 and rotatably capture the armature shaft 42 and spacer 108 thereon relative to the bearing 104.

Regarding FIG. 3, the worm screw 44 includes a body 120 having the through bore 48 formed therein. The body 120 includes one or more threads 122 extending from a sleeve portion 124 of the body 120. The distal end portion 46 of the armature shaft 42 includes a protruding end 130 that extends distally beyond a distal end 132 (see FIG. 4) of the worm screw 44. The nose bearing 134 may be a sleeve bearing and is received in the opening 136. The nose bearing 34 has a central opening 138 that receives the protruding end 130 of the armature shaft 42. The protruding end 130 of the armature shaft 42 is rotatably supported in the nose bearing 134.

Figure 6:
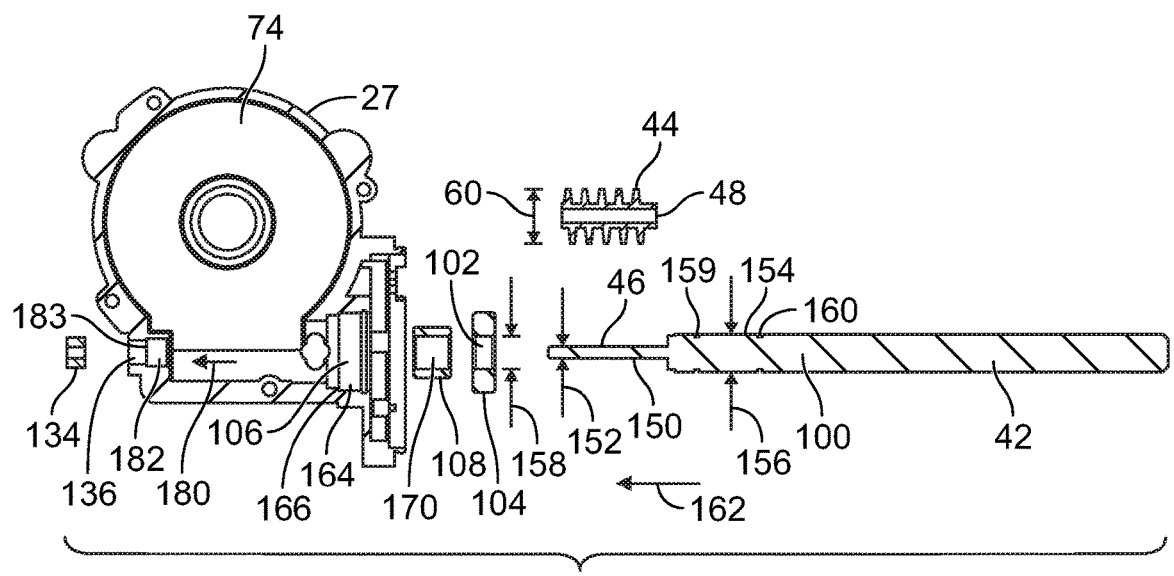
FIG. 6 is an example cross-sectional view of a body of the gearbox, bearings, bushing, worm screw, and armature shaft of FIG. 5.
Figure 7:
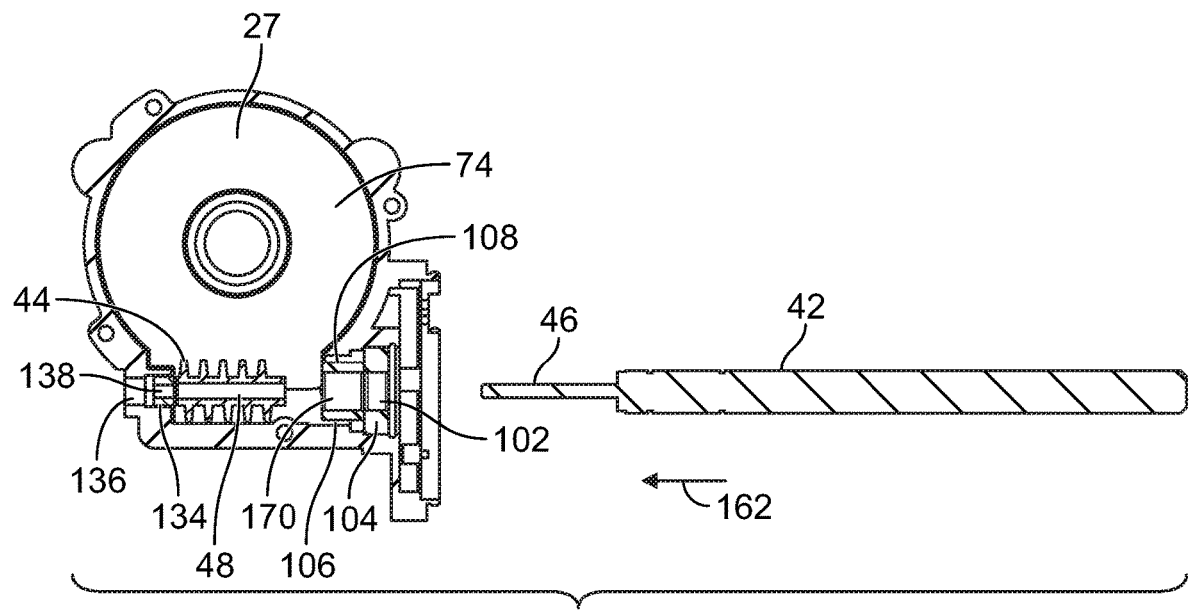
FIG. 7 is an example view similar to FIG. 6 showing the worm screw positioned in a compartment of the gearbox body and the bearings and bushing positioned in the gearbox body.
Figure 8:
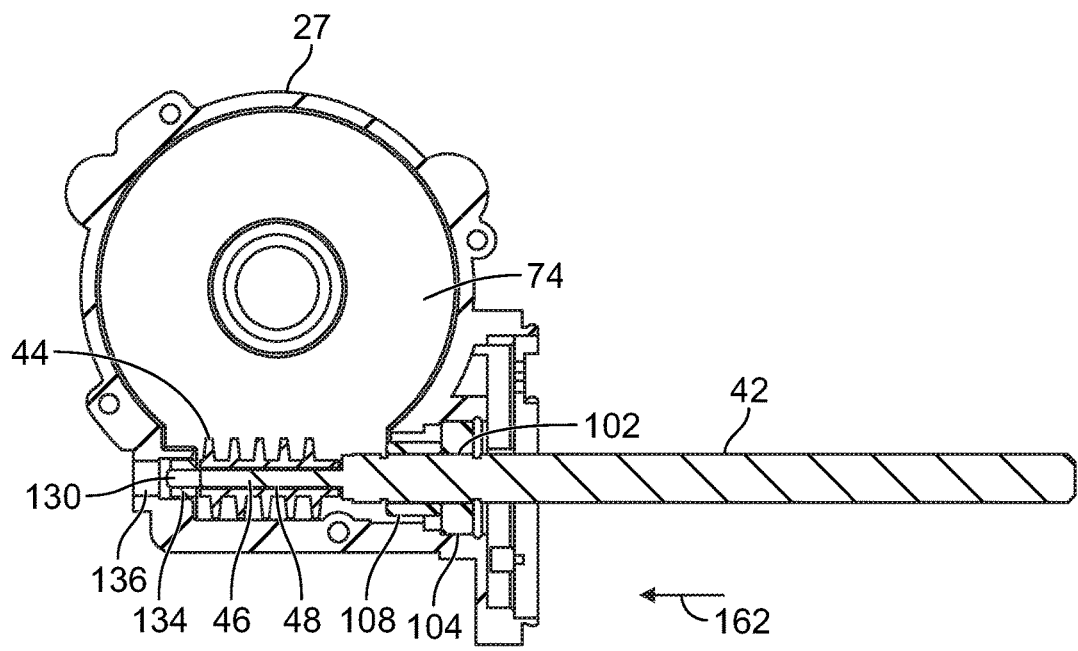
FIG. 8 is an example view similar to FIG. 6 showing a distal end of the armature shaft advanced through a through bore of the worm screw and being supported by the bearings.

With reference to FIGS. 6-8, an example method of assembling a portion of the powertrain 20 is provided. Regarding FIG. 6, the gearbox body 27, worm screw 44, armature shaft 42, bearing 104, spacer 108, and nose bearing 134 are shown before assembly. The distal end portion 46 of the armature shaft 42 has a cylindrical outer surface 150 having a width, such as an outer diameter 152, and the intermediate portion 100 includes a cylindrical outer surface 154 with a width, such as an outer diameter 156, that is larger than the outer diameter 152 of the distal end portion 46. The outer diameter 156 of the intermediate portion 100 is also less than an inner diameter 158 of the central opening 102 of the bearing 104 to permit the intermediate portion 100 to be advanced through the central opening 102 of the bearing 104.

Regarding FIG. 6, the worm screw 44 has a width, such as an outer diameter 60, that is larger than the inner diameter 158 of the bearing 104. In contrast to some prior approaches, the larger diameter 60 inhibits the worm screw 44 from being advanced in direction 162 through the bearing 104 once the bearing 104 has been mounted in a bearing portion 164 of the opening 106 of the gearbox body 27. The gearbox body 27 has a shoulder 166 against which the bearing 104 is seated when the bearing 104 is advanced in direction 162 into the bearing portion 164 of the opening 106. In one embodiment, the bearing 104 has an outer diameter sized to be in interference with the inner diameter of the bearing portion 164 of the opening 106 such that the bearing 104 is mounted in the opening 106 by pressing the bearing 104 into the bearing portion 164 of the opening 106. The spacer 108 has an opening 170 with an inner diameter sized to fit over the outer surface 154 of the intermediate portion 100 of the armature shaft 42.

Regarding FIG. 6, the nose bearing 134 may be mounted in the opening 136 by positioning the nose bearing 134 in the compartment 74 and advancing the nose bearing 134 in direction 180 into a bearing portion 182 of the opening 136. The gearbox body 27 may have a shoulder 183 and the nose bearing 134 seats against the shoulder 183. The nose bearing 134 may have a press-fit engagement in the bearing portion 182 of the opening 136.

Regarding FIG. 7, the worm screw 44 is positioned in the compartment 74 such as by advancing the worm screw 44 into the page in FIG. 7 through the opening 70 (see FIG. 2) before the cover 72 is connected to the gearbox body 27. The spacer 108 and the bearing 104 are advanced into the opening 106 in direction 162 so that the openings 170, 102 of the spacer 108 and bearing 104 are axially aligned with the through bore 48 of the worm screw 44 and the central opening 138 of the nose bearing 134.

Regarding FIGS. 7 and 8, the method includes advancing the distal end portion 46 of the armature shaft 42 in direction 162 through the openings 102, 170 of the bearing 104 and spacer 108 and into the through bore 48 of the worm screw 44. The bearing 104 may be a roller bearing with a rotatable inner ring and the armature shaft 42 may have a slip fit or a press fit connection with the inner ring of the bearing 104. The method includes advancing the distal end portion 46 of the armature shaft 42 in direction 162 until the protruding portion 130 extends beyond the distal end 132 of the worm screw 44 and into the central opening 138 of the nose bearing 134.

To connect the armature shaft 42 to the worm screw 44, the distal end portion 46 of the armature shaft 42 is advanced in direction 162 into the through bore 48 of the worm screw 44. The process of connecting the armature shaft 42 to the worm screw 44 may include forming a press fit engagement between the worm screw 44 and the distal end portion 46 of the armature shaft 42. For example, the worm screw 44 may be heated to expand the inner diameter of the through bore 48 and/or the distal end portion 46 cooled to decrease the outer diameter of the distal end portion 46 before the distal end portion 46 is advanced in direction 162 into the through bore 48 of the worm screw 44. The worm screw 44 and the armature shaft 42 are fixed together once the materials of the worm screw 44 and armature shaft 42 return to ambient temperature. In other embodiments, the connection of the worm screw 44 and the armature shaft 42 may include welding or gluing the worm screw 44 to the armature shaft 42. In yet another embodiment, the connecting of the worm screw 44 and the armature shaft 42 may include engaging threads of the armature shaft 42 and worm screw 44. As another example, the distal end portion 46 may have splines and the worm screw 44 may have grooves that receive the splines to rotationally fix the distal end portion 46 and worm screw 44. As yet another example, the distal end portion 46 may have a section with a non-circular cross section, such as a D-shape, and the worm screw 44 has a quasi-mating shape for causing an interference or friction fit.

The method of assembling the powertrain 20 may further include positioning the worm wheel 50 into the compartment 24 so that the teeth 51 of the worm wheel 50 are engaged with the one or more threads of the worm screw 44. The worm wheel 50 may be connected to the output shaft 28 and drive shaft 30 before or after the worm wheel 50 is positioned in the compartment 24. The method may further include adding lubricant in the compartment 74 and connecting the cover 72 to the gearbox body 27 in order to close and/or seal the compartment 74. The cover 72 and body 27 of the gear box have openings through which the shafts 28, 30 protrude.

In one embodiment, the gearbox body 27, armature shaft 42, and worm screw 44 are made of a metallic material such as steel. The worm wheel 50 may be made of a plastic material. The plastic material of the worm wheel 50 may permit the teeth 51 of the worm wheel 50 to be deformed by the worm screw 44 in the event the garage door 18 becomes stuck, which avoids damage to the worm screw 44 and motor 24.

Figure 9:
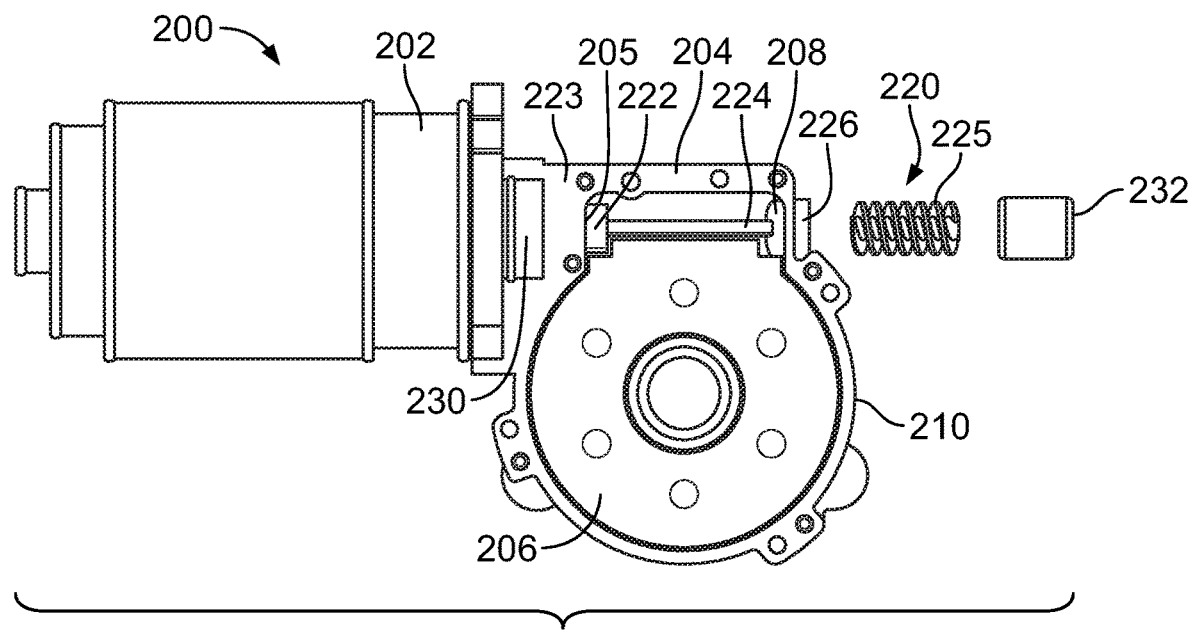
FIG. 9 is an example plan view of a portion of another motor and gearbox assembly including a gearbox body having a compartment and a distal end portion of an armature shaft of the motor extending into the compartment.

Regarding FIG. 9, a portion of a powertrain 200 is provided that is similar in many respects to the powertrain 20 discussed above such that differences will be highlighted. The powertrain 200 includes a motor 202 and a gearbox body 204 having a primary opening, such as opening 205, and one or more secondary openings, such as openings 208, 210. The gearbox body 204 includes a compartment 206 in communication with the openings 205, 208 and 210 that receives a worm wheel 212 (see FIG. 13). The powertrain 200 includes a cover that connects to the gearbox body 204 and closes the opening 210.

The motor 202 includes an armature assembly 220 having an armature shaft 222 with a distal end portion 224 and a worm screw 225. The gearbox body 204 includes a side wall 223 having the opening 205 formed therein and the motor 202 is mounted to the side wall 223. The gearbox body 204 further includes a side wall 226 having the opening 208 formed therein. The powertrain 200 includes a bearing 230 for supporting an intermediate portion of the armature shaft 222 and a nose bearing 232, such as a sleeve bearing, that is mounted in the opening 208 to support the distal end portion 224 of the armature shaft 222.

Figure 10:
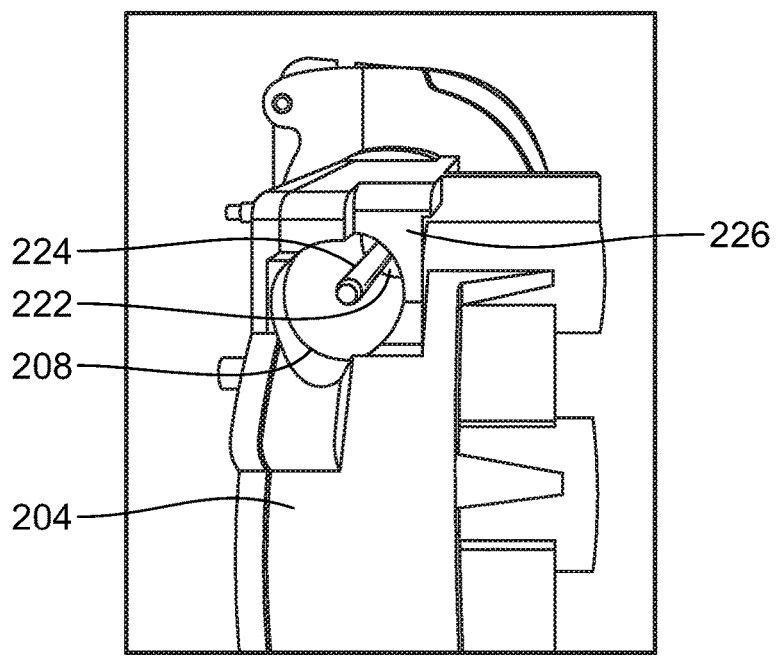
FIG. 10 is an example side perspective view of the gearbox body of FIG. 9 showing a through opening in a side wall of the gearbox body and the distal end portion of the armature shaft in the compartment of the gearbox body.
Figure 11:
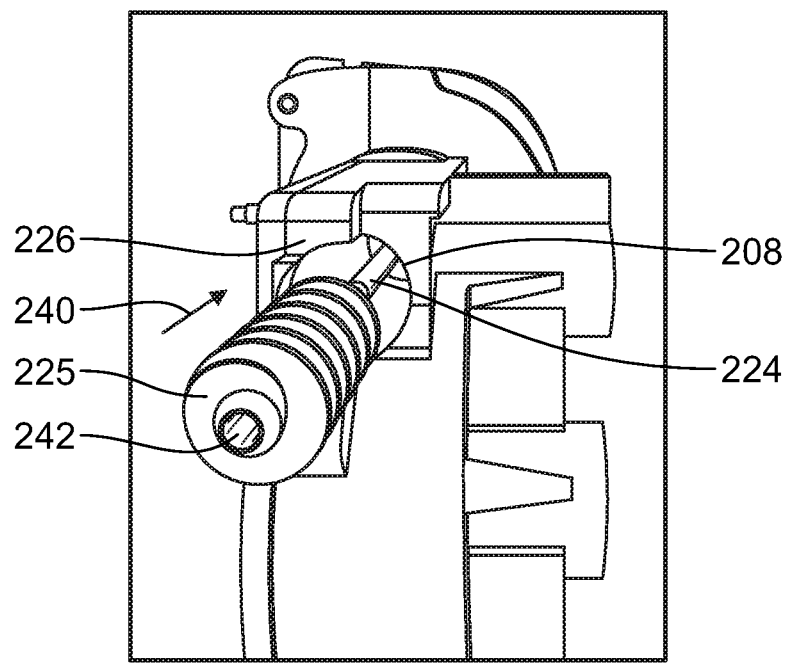
FIG. 11 is an example view similar to FIG. 10 showing the worm screw being advanced into the through opening of the gearbox body side wall and onto the distal end portion of the armature shaft.

Regarding FIGS. 10-13, a method of assembling a portion of the powertrain 200 is provided. In FIG. 10, the opening 208 is shown in the side wall 226 of the gearbox body 204. The distal end portion 224 of the armature shaft 222 is aligned with the opening 208. Regarding FIG. 11, the worm screw 225 is shown aligned with the opening 208 of the side wall 226 of the gearbox body 204. In one embodiment, the worm screw 225 has an outer diameter larger than an inner diameter of the bearing 230 and smaller than an inner diameter of the opening 208. The worm screw 225 is advanced in direction 240 into the opening 208 such that a through bore 242 of the worm screw 225 is aligned with the distal end portion 224 of the armature shaft 222. The worm screw 225 is advanced further in direction 240 to fit the through bore 242 of the worm screw 225 onto the distal end portion 224 of the armature shaft 222. Because the worm screw 225 enters the compartment 206 through the opening 208, the worm screw 225 is advanced into the compartment 206 of the gearbox body 204 via the opening 208. In this manner, the outer diameter of the worm screw 225 is not limited by an inner diameter of the bearing 230.

Figure 12:
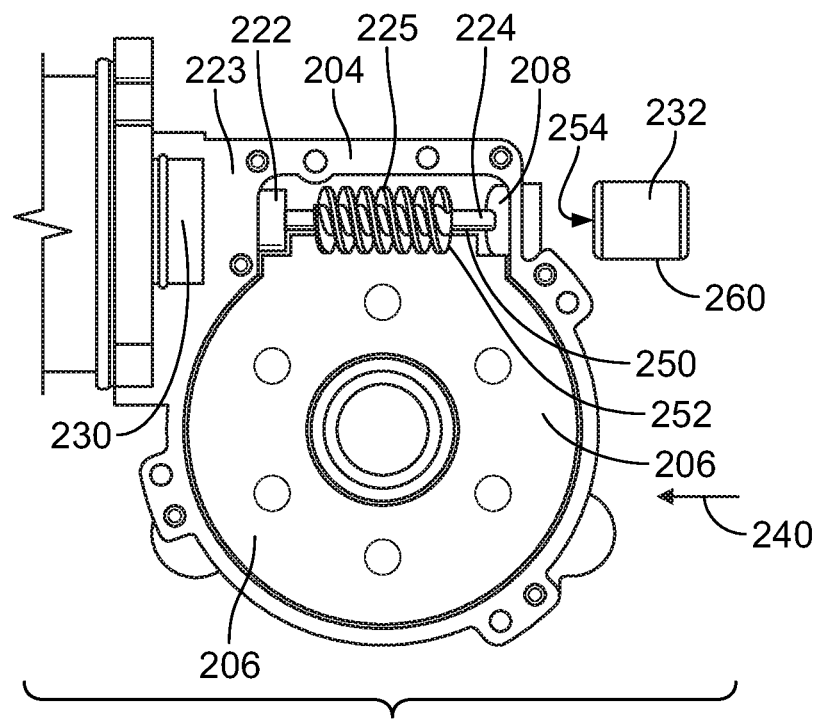
FIG. 12 is an example plan view similar to FIG. 9 showing the worm screw on the distal end portion of the armature shaft and a nose bearing being advanced into the side wall opening of the gearbox body.

Regarding FIG. 12, the worm screw 225 has been fit onto and along the distal end portion 224 of the armature shaft 222 and into the compartment 206 of the gearbox body 204. The armature shaft 222 has a protruding end 250 extending distally beyond a distal end 252 of the worm screw 225. The nose bearing 232 is positioned so that a central opening 254 of the nose bearing 232 is aligned with the protruding end 250 of the armature shaft 222.

Figure 13:
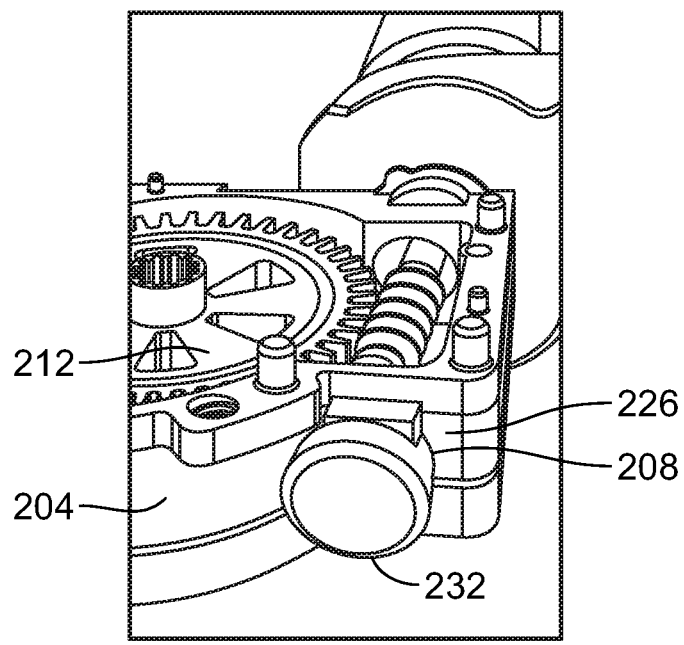
FIG. 13 is an example side perspective view of the portion of the gearbox of FIG. 9 showing the nose bearing mounted in the side wall opening of the gearbox body and a worm wheel positioned in the compartment of the gearbox body and engaged with the worm screw.

Regarding FIGS. 12 and 13, the nose bearing 232 is advanced in direction 240 into the opening 208 of the gearbox body 204. The nose bearing 232 has a plug portion 260 with an outer diameter larger than an inner diameter of the opening 208 to create an interference fit therebetween. In other embodiments, the nose bearing 232 is glued, screwed, and/or threaded into the opening 208. Regarding FIG. 13, the nose bearing 232 is shown mounted in the opening 208 to rotatably support the protruding end 250 of the armature shaft 222.

Figure 14:
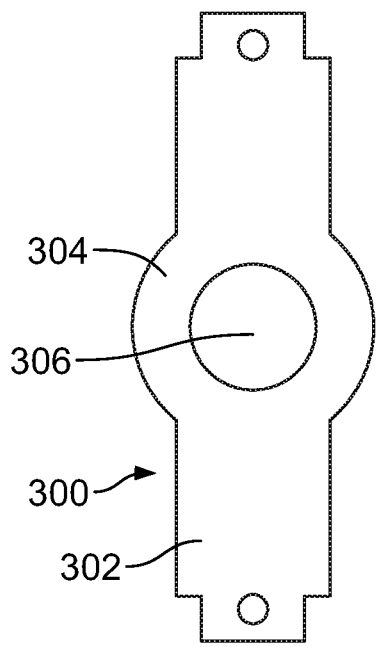
FIG. 14 is a plan view of an example bearing bracket.

Regarding FIG. 14, a retainer plate or bearing bracket 300 is provided that may be utilized in a powertrain, such as in the gearbox body 27, to keep the bearing 104 from moving in a direction opposite to direction 162 (see FIG. 7) out of the opening 106. For example, the bearing 104 may have a slip-fit engagement in the opening 106 of the gearbox body 27. The bearing bracket 300 includes a body 302 having an annular portion 304 extending about an opening 306. The opening 306 is sized to receive the armature shaft 42. The body 302 is secured, such as via welds or fasteners, to the gearbox body 27 to contact and resist removal of the bearing 104 from the opening 106. The body 302 thereby retains the bearing 104 in the opening 106, and the snap rings 112, 114 retain the armature shaft 42 in the bearing 104.

Figure 15:
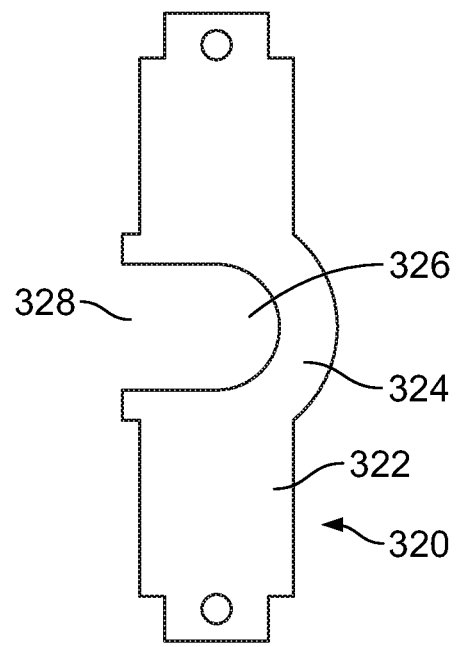
FIG. 15 is a plan view of another example bearing bracket.

Regarding FIG. 15, another bearing bracket 320 is provided that may be utilized in a manner similar to bearing bracket 300. The bearing bracket 320 has a body 322 with a C-shaped portion 324 extending about an opening 326 for receiving the armature shaft 42. The opening 326 has an open end portion 328 that permits the bearing bracket 320 to be placed onto the armature shaft 42 in a direction transverse to the length of the armature shaft 42 rather than fitting the armature shaft 42 through the opening 306. The bearing bracket 320 may thereby be positioned onto the armature shaft 42 after the armature shaft 42 has been advanced through opening 102 of the bearing 104, which may be desirable in some applications.

While there have been illustrated and described particular embodiments of the present invention, it will be appreciated that numerous changes and modifications will occur to those skilled in the art, and it is intended for the present invention to cover all those changes and modifications which fall within the scope of the appended claims. For example, the movable barrier operator 12 may take the form of a jackshaft-type operator. It is intended that the phrase "at least one of" as used herein be interpreted in the disjunctive sense. For example, the phrase "at least one of A and B" is intended to encompass only A, only B, or both A and B.

What is claimed is:

1. A movable barrier operator for selectively opening and closing a movable barrier, the movable barrier operator comprising:
    a motor;
    an elongate armature shaft of the motor including a distal end portion and a proximal end portion opposite the distal end portion;
    a worm screw assembled with the distal end portion of the armature shaft;
    a worm wheel engaged with the worm screw;
    a rotatable drive member connected to the worm wheel so that turning of the armature shaft and the worm screw assembled therewith causes turning of the worm wheel and rotatable drive member;
    wherein the distal end portion of the armature shaft extends distally beyond a distal end of the worm screw;
    a bearing having a central opening that receives the distal end portion of the armature shaft distal of the distal end of the worm screw;
    a gearbox housing including a compartment that receives the worm screw and the worm wheel and a side wall with a through opening that opens to the compartment, the bearing received in the through opening;
    wherein the gearbox housing includes a second side wall having a second through opening therein and a second bearing received in the second through opening, the second bearing having a central opening aligned with the central opening of the bearing so that the distal end portion of the armature shaft extends through the central opening of the bearing and an intermediate portion of the armature shaft extends through the central opening of the second bearing.

2. The movable barrier operator of claim 1 wherein the worm screw including a through bore and the distal end portion of the armature shaft extends in the through bore of the worm screw.

3. The movable barrier operator of claim 1 wherein the bearing has a central opening with an inner diameter;
    wherein the worm screw has an outer diameter larger than the inner diameter of the central opening of the bearing.

4. The movable barrier operator of claim 1 wherein the worm screw has an outer diameter and the central opening of the second bearing has an inner diameter smaller than the outer diameter of the worm screw.

5. The movable barrier operator of claim 1 wherein the worm screw has an outer diameter and the through opening of the second side wall has a diameter larger than the outer diameter of the worm screw.

\* \* \* \* \*